United States Patent [19]
Hoffmann et al.

[11] Patent Number: 6,137,208
[45] Date of Patent: Oct. 24, 2000

[54] DEVICE AND METHOD FOR DRIVING A CAPACITIVE ACTUATOR

[75] Inventors: Christian Hoffmann, Regensburg, Germany; Georg Brasseur, Vienna, Austria; Hellmut Freudenberg, Grossberg, Germany; Hartmut Gerken, Nittendorf, Germany; Richard Pirkl, Regensburg, Germany

[73] Assignee: Siemens Aktiengesellschaft, Munich, Germany

[21] Appl. No.: 09/250,875

[22] Filed: Feb. 16, 1999

Related U.S. Application Data

[63] Continuation of application No. PCT/DE97/01646, Aug. 5, 1997.

[30] Foreign Application Priority Data

Aug. 14, 1996 [DE] Germany .......................... 196 32 872

[51] Int. Cl.$^7$ ................................................. H01L 41/09
[52] U.S. Cl. ....................................................... 310/316.03
[58] Field of Search ........................................ 310/316.03

[56] References Cited

U.S. PATENT DOCUMENTS

| | | | |
|---|---|---|---|
| 5,208,505 | 5/1993 | Mitsuyasu | 310/317 |
| 5,477,831 | 12/1995 | Akaki et al. | 123/490 |
| 5,479,062 | 12/1995 | Yoshino | 310/316 |

FOREIGN PATENT DOCUMENTS

| | | | |
|---|---|---|---|
| 0 464 443 A1 | 1/1992 | European Pat. Off. | F02D 41/40 |
| 36 21 541 A1 | 1/1987 | Germany | F02D 41/20 |
| 61-271881 | 12/1986 | Japan | 310/316.03 |

*Primary Examiner*—Thomas M. Dougherty
*Attorney, Agent, or Firm*—Herbert L. Lerner; Laurence A. Greenberg; Werner H. Stemer

[57] ABSTRACT

A device and a method for driving at least one capacitive actuator, in particular a piezoelectrically operated fuel injection valve of an internal combustion engine, by a microprocessor-controlled control circuit. The device has a charging capacitor which can be recharged by an energy source, which charges the at least one actuator via switches controlled by the control circuit, and into which the actuator is discharged again.

11 Claims, 3 Drawing Sheets

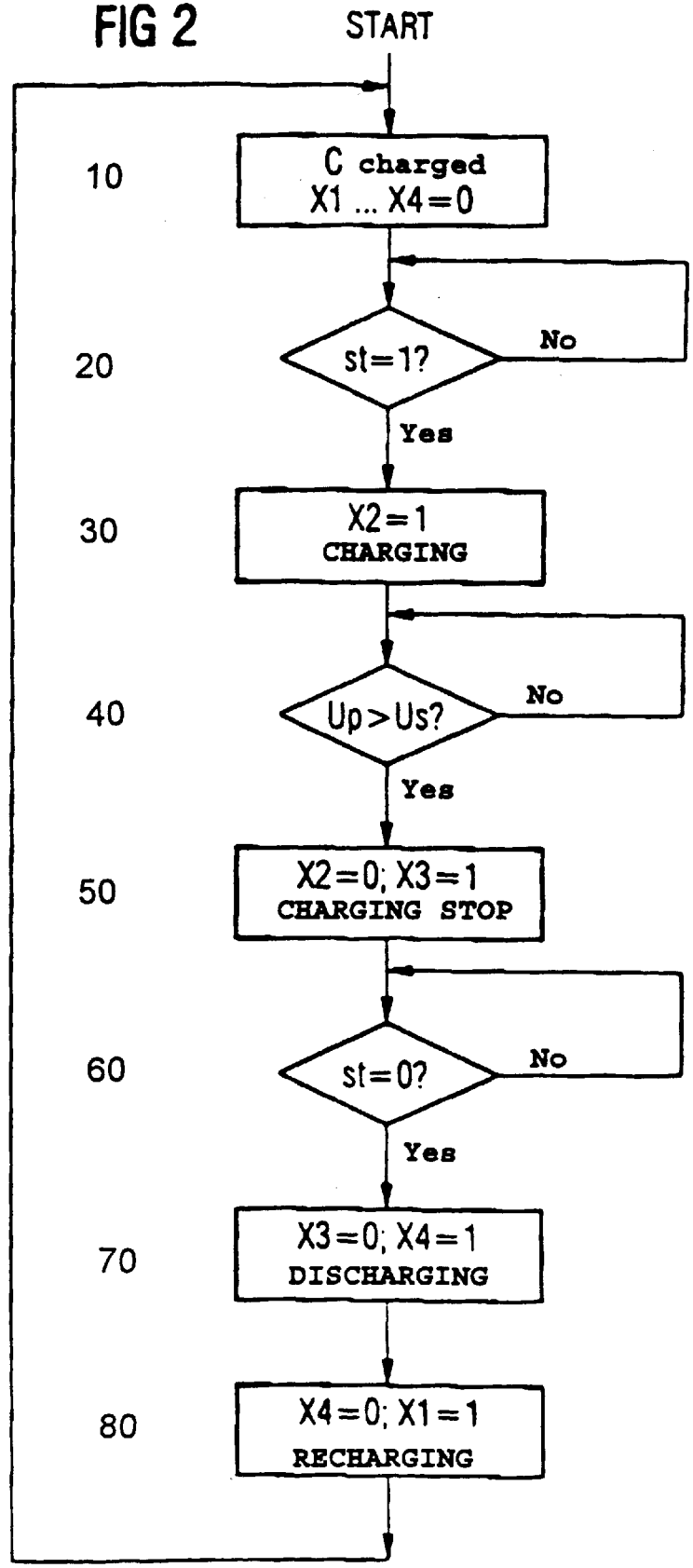

DEVICE AND METHOD FOR DRIVING A CAPACITIVE ACTUATOR

CROSS-REFERENCE TO RELATED APPLICATION

This application is a continuation of copending International application No. PCT/DE97/01646, filed Aug. 5, 1997, which designated the United States.

BACKGROUND OF THE INVENTION

Field of the Invention

The invention relates to a device for driving at least one capacitive actuator, in particular a piezoelectrically operated fuel injection valve of an internal combustion engine. The invention also relates to a method for operating the device.

Published European Patent Application EP 0 464 443 A1 discloses a piezoelectric actuator which is charged from a capacitor via a charging coil. During discharging of the piezoelectric actuator, part of the energy applied is fed back into the capacitor via a discharging coil, while the other part is converted into heat, likewise via the discharging coil. During discharging, a negative voltage is present across the piezoelectric actuator. German Patent DE 36 21 541 C2 discloses a driver circuit for a piezoelectric actuator of a fuel injection valve which is charged via a series circuit, connected to a voltage source and composed of two capacitors, and a charging coil, and is discharged into one of the two capacitors via a discharging coil. In an alternative configuration, the actuator is charged via a capacitor, connected to a voltage source, and a charging coil; during discharging, the energy stored in the piezoelectric actuator is destroyed by a discharging coil.

SUMMARY OF THE INVENTION

It is accordingly an object of the invention to provide a device and a method for driving a capacitive actuator that overcomes the above-mentioned disadvantages of the prior art devices of this general type, which operates as far as possible without loss and is of simple design, and in which it is also possible to prescribe different desired values for the voltage occurring across the actuator, and in which negative voltages across the actuator are avoided.

With the foregoing and other objects in view there is provided, in accordance with the invention, a device for driving at least one capacitive actuator, including: an energy switch connected to a positive pole of an energy source; a charging capacitor disposed between the energy switch and a negative pole of the energy source, the energy source re-charging the charging capacitor via the energy switch; a series circuit including a ring-around coil connected to the energy switch and a charging stop switch connected in series with the ring-around coil, the series circuit connected in parallel with the charging capacitor; and an actuator circuit connected in parallel with the charging stop switch, the actuator circuit including: a discharging switch having a first side connected to the ring-around coil for conducting current to the ring-around coil and a second side; at least one further series circuit including a charging switch connected to the ring-around coil for conducting current away from the ring-around coil and a diode having a first side connected to the second side of the discharging switch for conducting current in a discharging direction toward the ring-around coil and a second side to be connected to a capacitive actuator to be driven and to the charging switch; and a further diode connected between the charging switch and the negative pole for conducting current in a direction of the charging switch, the further diode to be also connected in parallel with the capacitive actuator to be driven.

In accordance with an added feature of the invention, the energy switch, the charging switch and the discharging switch include controlled, electronic switches for conducting current only in one direction and have at least one semiconductor element.

In accordance with an additional feature of the invention, there is a control circuit receiving and storing at least one desired value relating to one of a position of the capacitive actuator and a voltage present across the capacitive actuator, the control circuit outputting control commands received by the charging switch, the charging stop switch, and the discharging switch in dependence on external control signals received by the control circuit and pertaining to one of the position of the capacitive actuator and the voltage present across the capacitive actuator, and on the at least one desired value.

With the foregoing and other objects in view there is also provided, in accordance with the invention, in combination with a control circuit, a device controlled by the control circuit for driving at least one capacitive actuator, the device including: an energy switch connected to a positive pole of an energy source; a charging capacitor disposed between the energy switch and a negative pole of the energy source, the energy source re-charging the charging capacitor via the energy switch; a first series circuit including a ring-around coil connected to the energy switch and a charging stop switch connected in series with the ring-around coil, the first series circuit connected in parallel with the charging capacitor; an actuator circuit disposed in parallel with the charging stop switch and having a second series circuit including a discharging switch connected to the ring-around coil for conducting current to the ring-around coil, a charging switch connected in parallel with the discharging switch and conducting current away from the ring-around coil, and a diode connected in series with the charging switch; and at least one electronic selector switch having a switching junction and a switching diode bridging the switching junction and conducting current in a discharging direction, the at least one electronic selector switch connected to and controlled by the control circuit, the at least one electronic selector switch to be connected to a first side of a capacitive actuator to be driven and the discharging switch to be connected to a second side of the capacitive actuator to be driven, the at least one electronic selector switch and the capacitive actuator to be driven defining a third series circuit disposed in parallel with the diode.

With the foregoing and other objects in view there is further provided, in accordance with the invention, a method for operating the above-described device, which includes: recharging the capacitive actuator from the charging capacitor upon a start of a control signal until a voltage present across the capacitive actuator reaches a prescribed desired value; maintaining subsequently the voltage across the capacitive actuator up to an end of the control signal; discharging the capacitive actuator into the charging capacitor after the completion of the end of the control signal; and recharging the charging capacitor by the energy source following the discharging step.

Other features which are considered as characteristic for the invention are set forth in the appended claims.

Although the invention is illustrated and described herein as embodied in a device and a method for driving a capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a flowchart relating to a mode of operation of the first exemplary embodiment according to FIG. 1;

DESCRIPTION OF THE PREFERRED EMBODIMENTS

Figure 1:
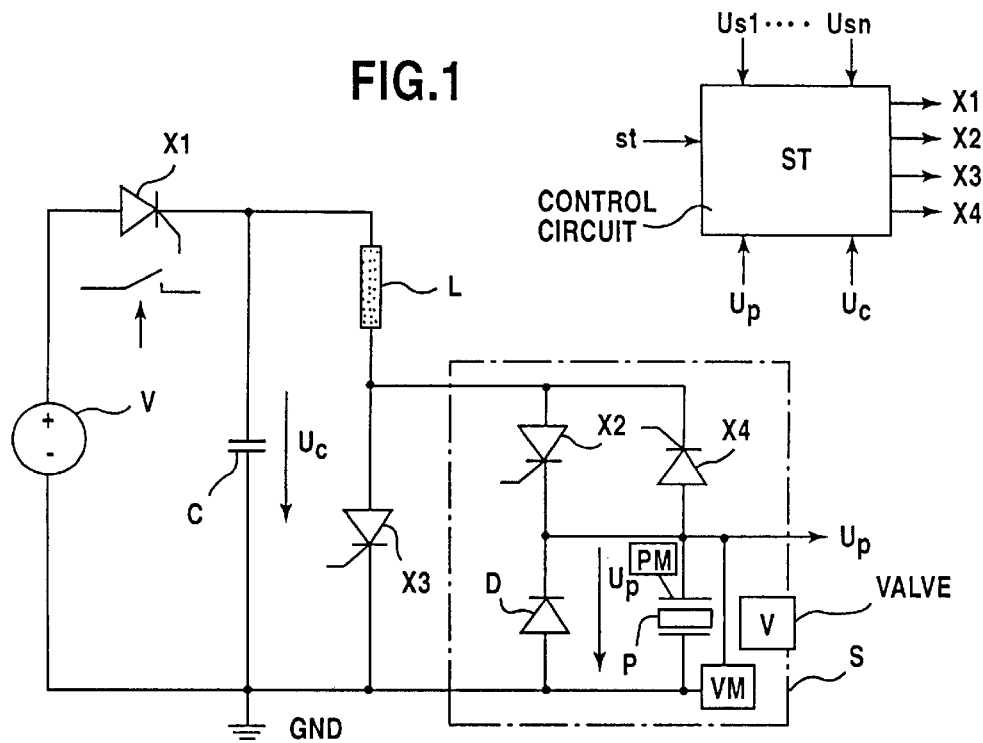
FIG. 1 is a diagrammatic circuit diagram of a first exemplary embodiment of a circuit according to the invention.

In all the figures of the drawing, sub-features and integral parts that correspond to one another bear the same reference symbol in each case. Referring now to the figures of the drawing in detail and first, particularly, to FIG. 1 thereof, there is shown a block diagram for driving an individual fuel injection valve V of an internal combustion engine via a piezoelectric actuator P by a control circuit ST which is usually controlled by a microprocessor.

Connected between a positive pole +V and a negative pole GND of an energy source V is a series circuit composed of a charging capacitor C and a controlled, electronic energy switch X1 which passes current only in one direction.

In the further description, when switches X1 to X4 are mentioned they are electronic switches, preferably thyristor switches, which pass current only in one direction, consist of at least one semiconductor element and are driven by the control circuit ST.

In the conducting state of the energy switch X1, the charging capacitor C is charged by the energy source V. This can be performed in principle as long as the voltage Uc across the charging capacitor is lower than the voltage of the energy source V.

Connected in parallel with the charging capacitor C is a series circuit composed of a ring-around coil L connected to the energy switch X1, and a charging stop switch X3, whose function will be explained later.

Disposed in parallel with the charging stop switch X3 is an actuator circuit S which has a series circuit which is composed of a parallel circuit including a charging switch X2, which passes current in the direction away from the ring-around coil L, and a discharging switch X4 which passes current in the direction of the ring-around coil L, and of a parallel circuit including the actuator P with a diode D, which passes current in the direction of the charging switch X2.

The switches X1 to X4 are controlled by the microprocessor-controlled circuit ST as a function of external control signals st of, in this exemplary embodiment, a prescribed desired value Us (there can also be a plurality which become active one after another, for example preinjection and main injection of fuel) for the voltage present across the actuator P, and of an actual value Up of the voltage. The position of the actuator P can also be used from a position detector PM instead of the actuator voltage, taken by a voltage detector VM.

A method for operating the device is described in the example of the circuit according to FIG. 1 with the aid of the flow chart shown in FIG. 2, starting from an initial state (step 10) in which the charging capacitor C is fully loaded, all the switches X1 to X4 are non-conducting and the ring-around coil L is de-energized.

With the start of an external control signal st=1 (step 20), the charging switch X2 is triggered (controlled to be conducting). Consequently, the charging capacitor C starts to discharge via the ring-around coil L into the actuator P (acting like a capacitor), and to charge the actuator P (step 30), the effect being to change the length of the piezoelectric actuator P. There is an increase in the voltage Up present across the actuator P, which is communicated to the control circuit ST (indicated by arrows in FIG. 1).

As soon as the voltage Up reaches the desired value Us (step 40), the charging operation is terminated, the charging switch X2 becomes non-conducting, that is to say X2=0, and the charging stop switch X3 becomes conducting (X3=1, step 50). The resonant circuit L-C continues to oscillate until the ring-around coil L is de-energized.

The state of charge of the actuator P is maintained as long as the control signal st is present. When it vanishes (st=0, step 60), the actuator P must be discharged. For this purpose, the charging stop switch X3 is controlled to be non-conducting, X3=0, and the discharging switch X4 to be conducting, X4=1 (step 70). The actuator P is now discharged via the ring-around coil L into the charging capacitor C. If the actuator P is discharged down to the threshold voltage of the diode D, the latter takes over the current; the resonant circuit L-C continues to oscillate until the ring-around coil is de-energized. The switch X4 is controlled to be non-conducting.

In the absence of losses, the same voltage Uc would now be present across the charging capacitor C as in the initial step 10. In fact, however, because of losses it has become somewhat lower, with the result that, in this exemplary embodiment, after termination of the discharging operation, when the switches X2 to X4 are once again non-conducting, the energy switch X1 is switched to be conducting to recharge the charging capacitor C (step 80) before a new charging cycle begins.

Figure 3:
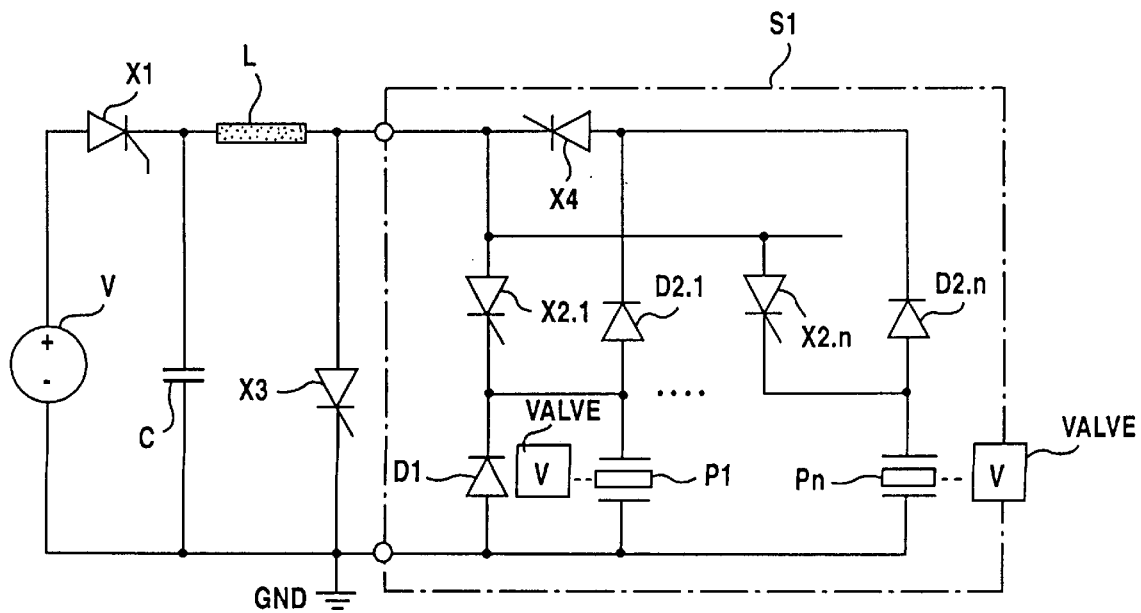
FIG. 3 is a circuit diagram of a second exemplary embodiment of the circuit.

FIG. 3 shows a circuit corresponding in principle to the circuit according to FIG. 1, but for driving a plurality of actuators P1 to Pn. In this circuit, the energy source V, the energy switch X1, the charging capacitor C, the ring-around coil L and the charging stop switch X3 are connected as in the case of the circuit according to FIG. 1 and acts just as described there. However, the control circuit ST is not represented again here.

For a first actuator P1, an actuator circuit S1 with a charging switch X2.1 instead of X2, the diode D and the discharging switch X4 has the same circuit as in FIG. 1, with the difference that there is connected between the actuator P1 and the discharging switch X4 a diode D2.1 which conducts current towards the discharging switch and is not required for driving only one actuator according to FIG. 1, and that for each further actuator P2 to Pn a further charging switch X2.2 to X2.n and a further diode D2.2 to D2.n are provided in an appropriate circuit.

The charging switches X2.1 to X2.n, driven by the control circuit ST, select the actuator to be charged, while the diodes D2.1 to D2.n prevent other actuators than the selected one from also being charged. Each actuator is discharged via the diode D2.1 to D2.n assigned to it when the common discharging switch X4 is controlled to be conductive. If the respective actuator is discharged down to the threshold voltage of the diode D, the latter takes over the current; the resonant circuit L-C continues to oscillate until the ring-around coil L is de-energized.

Figure 4:
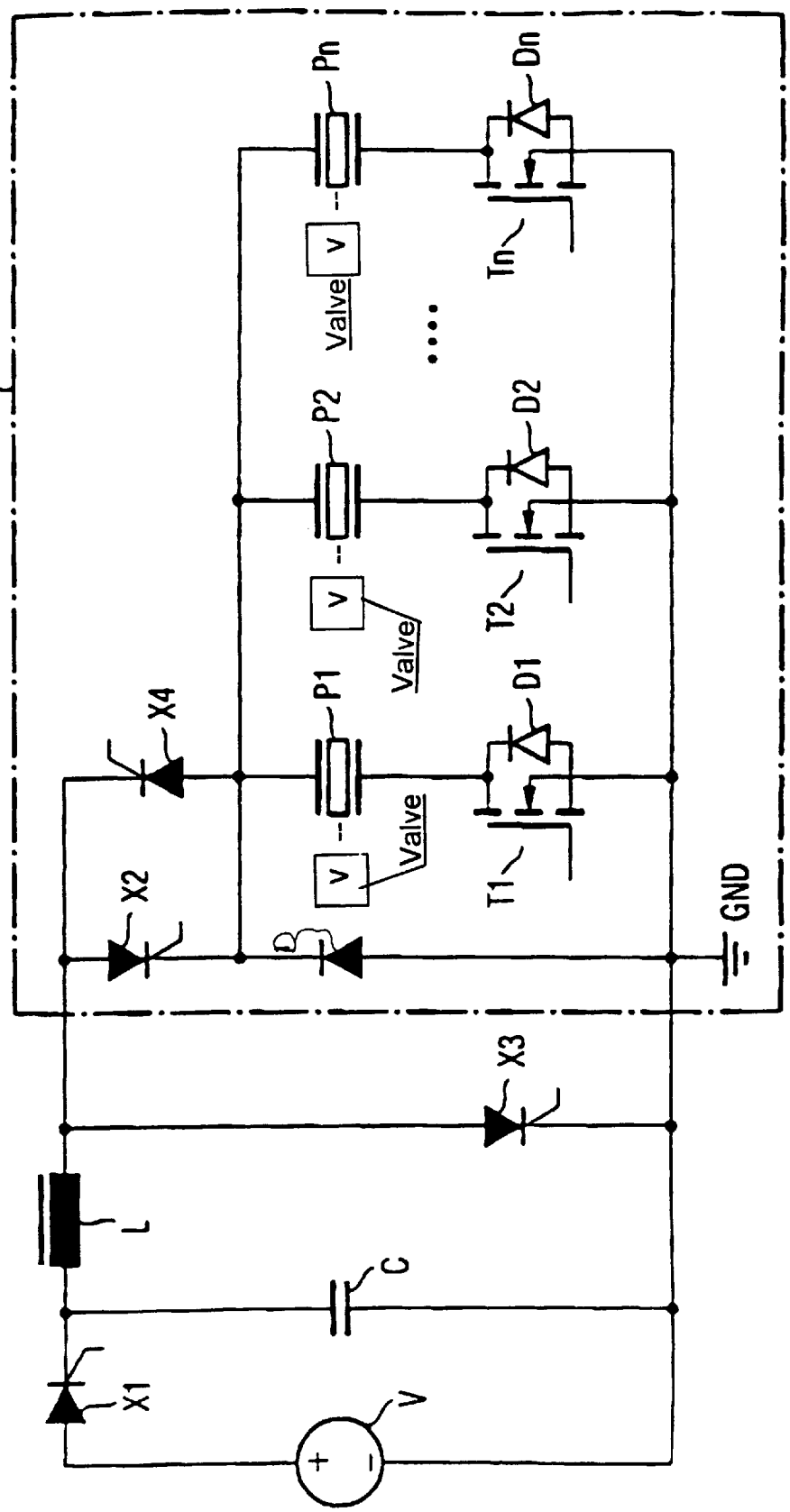
FIG. 4 is a circuit diagram of a third exemplary embodiment of the circuit.

FIG. 4 shows a further circuit for driving a plurality of actuators that have a reduced component outlay by comparison with the circuit according to FIG. 3. Once again, the control circuit ST is also not shown here.

The circuit according to FIG. 3 requires an expensive transformer to trigger each of the thyristor switches X2.1 to X2.n. These transformers are dispensable if, instead of them, use is made of simple selector switches T1 to Tn, for example power MOSFET switches. The circuit is then essentially reduced to a circuit corresponding to the circuit according to FIG. 1, in which the actuator P is replaced by a series circuit composed of an actuator P1 and an assigned selector switch T1. Connected in parallel with the switching junction of the selector switch T1 is a diode D1 that passes current in the discharging direction and is already integrated in MOSFET switches when they are used.

Such a series circuit composed of an actuator P2 to Pn, a selector switch T2 to Tn and a diode D2 to Dn is connected, for each further actuator P2 to Pn, in parallel with the series circuit P1-T1-D1 for the first actuator P1.

The mode of operation of this circuit corresponds to that of the circuits according to FIGS. 1 and 3, it being the case that during charging of the actuator, for example P1, the assigned selector switch T1 must be controlled to be conducting for at least as long as the charging switch X2 is controlled to be conducting.

During discharging of the actuator P1, the current flows from the actuator P1 via the discharging switch X4, the ring-around coil L, the charging capacitor C and the diode D1. If the actuator is discharged down to the threshold voltage of the diode D, the latter takes over the current and the resonant circuit L-C continues to oscillate until the ring-around coil L is de-energized.

By the simple changes both to the charging and discharging switches and to the selector switches, the circuits shown in FIGS. 1, 3 and 4 can be configured such that, depending on the preconditions, the actuators are either connected to the negative pole GND (low side, see FIGS. 1 and 3), or are situated closer to the positive pole +V (high side, see FIG. 4).

We claim:

1. A device for driving at least one capacitive actuator, comprising:
    an energy switch connected to a positive pole of an energy source;
    a charging capacitor disposed between said energy switch and a negative pole of the energy source, the energy source recharging said charging capacitor via said energy switch;
    a series circuit including a ring-around coil connected to said energy switch and a charging stop switch connected in series with said ring-around coil, said series circuit connected in parallel with said charging capacitor; and
    an actuator circuit connected in parallel with said charging stop switch, said actuator circuit including:
        a discharging switch having a first side connected to said ring-around coil for conducting current to said ring-around coil and a second side;
        at least one further series circuit including a charging switch connected to said ring-around coil for conducting current away from said ring-around coil and a diode having a first side connected to said second side of said discharging switch for conducting current in a discharging direction toward said ring-around coil and a second side to be connected to a capacitive actuator to be driven and to said charging switch; and
        a further diode connected between said charging switch and the negative pole for conducting current in a direction of said charging switch, said further diode to be also connected in parallel with the capacitive actuator to be driven.

2. The device according to claim 1, wherein said energy switch, said charging switch and said discharging switch include controlled, electronic switches for conducting current only in one direction and have at least one semiconductor element.

3. The device according to claim 1, including a control circuit receiving and storing at least one desired value relating to one of a position of the capacitive actuator and a voltage present across the capacitive actuator, said control circuit outputting control commands received by said charging switch, said charging stop switch, and said discharging switch in dependence on external control signals received by said control circuit and pertaining to one of the position of the capacitive actuator and the voltage present across the capacitive actuator, and on the at least one desired value.

4. The device according to claim 1, including a control circuit formulating at least one desired value relating to one of a position of the capacitive actuator and a voltage present across the capacitive actuator, said control circuit outputting control commands received by said charging switch, said charging stop switch, and said discharging switch in dependence on external control signals received by said control circuit and pertaining to one of the position of the capacitive actuator and the voltage present across the capacitive actuator, and the at least one desired value.

5. In combination with a control circuit, a device controlled by the control circuit for driving at least one capacitive actuator, the device comprising:
    an energy switch connected to a positive pole of an energy source;
    a charging capacitor disposed between said energy switch and a negative pole of the energy source, the energy source re-charging said charging capacitor via said energy switch;
    a first series circuit including a ring-around coil connected to said energy switch and a charging stop switch connected in series with said ring-around coil, said first series circuit connected in parallel with said charging capacitor;
    an actuator circuit disposed in parallel with said charging stop switch and having a second series circuit including a discharging switch connected to said ring-around coil for conducting current to said ring-around coil, a charging switch connected in parallel with said discharging switch and conducting current away from said ring-around coil, and a diode connected in series with said charging switch; and
    at least one electronic selector switch having a switching junction and a switching diode bridging said switching junction and conducting current in a discharging direction, said at least one electronic selector switch connected to and controlled by the control circuit, said at least one electronic selector switch to be connected to a first side of a capacitive actuator to be driven and said discharging switch to be connected to a second side of the capacitive actuator to be driven, said at least one electronic selector switch and the capacitive actuator to be driven defining a third series circuit disposed in parallel with said diode.

6. The device according to claim 5, wherein said energy switch, said charging switch and said discharging switch include controlled, electronic switches for passing current only in one direction and have at least one semiconductor element.

7. The device according to claim 5, wherein the control circuit receives and stores at least one desired value relating to one of a position of the capacitive actuator and a voltage present across the capacitive actuator, the control circuit outputting control commands received by said charging switch, said charging stop switch, said discharging switch, and said at least one electronic selector switch in dependence on external control signals received by the control circuit and pertaining to one of the position of the capacitive actuator and the voltage present across the capacitive actuator and the at least one desired value.

8. The device according to claim 5, wherein the control circuit formulates at least one desired value relating to one of a position of the capacitive actuator and a voltage present across the at least one capacitive actuator, the control circuit outputting control commands received by said charging switch, said charging stop switch, said discharging switch, and said electronic selector switch in dependence on external control signals received by the control circuit and pertaining to one of the position of the capacitive actuator and the voltage present across the capacitive actuator, and from the at least one desired value.

9. In combination with a control circuit, a device controlled by the control circuit and driving a piezoelectrically operated fuel injection valve of an internal combustion engine, comprising:

an energy switch connected to a positive pole of an energy source;

a charging capacitor disposed between said energy switch and a negative pole of the energy source, the energy source re-charging said charging capacitor via said energy switch;

a first series circuit including a ring-around coil connected to said energy switch and a charging stop switch connected in series with said ring-around coil, said first series circuit connected in parallel with said charging capacitor;

an actuator circuit disposed in parallel with said charging stop switch, said actuator circuit including:

a second series circuit including a discharging switch connected to said ring-around coil for conducting current to said ring-around coil, a charging switch connected in parallel with said discharging switch and conducting current away from said ring-around coil, and a diode connected in series with said charging switch; and at least one third series circuit connected in parallel with said diode, said at least one third series circuit including an electronic selector switch having a switching junction and a switching diode bridging said switching junction and conducting current in a discharging direction and a capacitive actuator connected in series with said electronic selector switch for driving a fuel injection valve, said electronic selector switch connected to and controlled by the control circuit.

10. A method for operating the device according to claim 1, which comprises:

recharging the capacitive actuator from the charging capacitor upon a start of a control signal until a voltage present across the capacitive actuator reaches a prescribed desired value;

maintaining subsequently the voltage across the capacitive actuator up to an end of the control signal;

discharging the capacitive actuator into the charging capacitor after the completion of the end of the control signal; and recharging the charging capacitor by the energy source following the discharging step.

11. A method for operating the device according to claim 5, which comprises:

recharging the capacitive actuator from the charging capacitor upon a start of a control signal until a voltage present across the capacitive actuator reaches a prescribed desired value;

maintaining subsequently the voltage across the capacitive actuator up to an end of the control signal;

discharging the capacitive actuator into the charging capacitor after the completion of the end of the control signal; and recharging the charging capacitor by the energy source following the discharging step.

* * * * *